US011186712B2

(12) United States Patent
Meng et al.

(10) Patent No.: US 11,186,712 B2
(45) Date of Patent: Nov. 30, 2021

(54) ULTRALOW-GLOSSINESS, ULTRALOW-TEMPERATURE RESISTANT ASA RESIN COMPOSITION AND PREPARATION METHOD THEREOF

(71) Applicant: SHANGHAI KUMHOSUNNY PLASTICS CO., LTD., Shanghai (CN)

(72) Inventors: Tao Meng, Shanghai (CN); Ting Zhou, Shanghai (CN); Minghua Luo, Shanghai (CN); Minqi Xin, Shanghai (CN)

(73) Assignee: SHANGHAI KUMHOSUNNY PLASTICS CO., LTD., Shanghai (CN)

(*) Notice: Subject to any disclaimer, the term of this patent is extended or adjusted under 35 U.S.C. 154(b) by 168 days.

(21) Appl. No.: 16/473,612

(22) PCT Filed: Dec. 30, 2016

(86) PCT No.: PCT/CN2016/113471
§ 371 (c)(1),
(2) Date: Jun. 25, 2019

(87) PCT Pub. No.: WO2018/120009
PCT Pub. Date: Jul. 5, 2018

(65) Prior Publication Data
US 2020/0148876 A1 May 14, 2020

(30) Foreign Application Priority Data
Dec. 26, 2016 (CN) .......................... 201611219042.X

(51) Int. Cl.
| | | |
|---|---|---|
| C08L 51/04 | (2006.01) | |
| B29C 48/00 | (2019.01) | |
| B29C 48/40 | (2019.01) | |
| B29B 9/10 | (2006.01) | |
| C08L 25/12 | (2006.01) | |
| C08L 27/18 | (2006.01) | |
| C08L 27/20 | (2006.01) | |
| C08L 33/12 | (2006.01) | |
| B29K 19/00 | (2006.01) | |
| B29K 27/18 | (2006.01) | |
| B29K 33/00 | (2006.01) | |
| C08K 3/36 | (2006.01) | |

(52) U.S. Cl.
CPC .............. *C08L 51/04* (2013.01); *B29B 9/10* (2013.01); *B29C 48/022* (2019.02); *B29C 48/40* (2019.02); *C08L 25/12* (2013.01); *C08L 27/18* (2013.01); *C08L 27/20* (2013.01); *C08L 33/12* (2013.01); *B29K 2019/00* (2013.01); *B29K 2027/18* (2013.01); *B29K 2033/12* (2013.01); *C08K 3/36* (2013.01); *C08L 2207/53* (2013.01)

(58) Field of Classification Search
CPC ........... C08L 51/04; C08L 25/12; C08L 27/18
See application file for complete search history.

(56) References Cited

U.S. PATENT DOCUMENTS

| | | | | |
|---|---|---|---|---|
| 5,948,858 A | * | 9/1999 | Dorrestijn | ............... C08L 55/02 525/66 |
| 6,174,958 B1 | * | 1/2001 | Guntherberg | ........... C08L 25/02 525/133 |
| 2006/0069207 A1 | * | 3/2006 | Dhawan | .................. C08L 55/02 525/191 |
| 2007/0129489 A1 | * | 6/2007 | Li | ......................... C08L 69/005 525/67 |
| 2018/0138126 A1 | * | 5/2018 | Chen | ................. H01L 21/76877 |

FOREIGN PATENT DOCUMENTS

| | | | |
|---|---|---|---|
| CN | 1422303 A | | 6/2003 |
| CN | 1511875 A | | 7/2004 |
| CN | 103772885 | | 5/2014 |
| CN | 104592666 A | * | 5/2015 |
| CN | 104592666 A | | 5/2015 |
| CN | 105175972 | | 12/2015 |
| KR | 20080036790 A | | 4/2008 |
| KR | 20150069888 A | | 6/2015 |

OTHER PUBLICATIONS

Priority Document of PCT/CN2016/113471.
RO/101 of PCT/CN2016/113471.
Published International Application of PCT/CN2016/113471.
Written Opinion of PCT/CN2016/113471.
International Search Report of PCT/CN2016/113471.

(Continued)

*Primary Examiner* — Mark S Kaucher
(74) *Attorney, Agent, or Firm* — Dragon Sun Law Firm, PC; Jinggao Li, Esq.

(57) ABSTRACT

The present disclosure provides an ultralow-glossiness, ultralow-temperature resistant ASA resin composition and preparation method thereof. The composition includes the following components in parts by weight: 20~60 parts of an acrylonitrile-styrene-acrylate graft copolymer, 40~80 parts of an acrylonitrile-styrene copolymer, 1~20 parts of an ultralow-glossiness, low temperature resistant modifier, and 0.1~5 parts of a processing aid. The ultralow-glossiness, low temperature resistant modifier includes a carrier copolymer, a fluorinated copolymer, a low-temperature flexibilizer, a coupling agent, fumed silica and an assistant. The ASA resin composition prepared by the present disclosure has an ultralow-glossiness, can be used to replace mold processing technology such leather marking and texturing, which greatly saves mold cost and processing production cost; and meanwhile it also has excellent low temperature resistance and can be applied in cases having requirements on low temperature resistance and low glossiness such as automobile parts, outdoor profiles, building materials and electrical appliances.

9 Claims, No Drawings

(56) References Cited

OTHER PUBLICATIONS

The Chinese First office action of Chinese Patent application No. 201611219042.X.

* cited by examiner

ULTRALOW-GLOSSINESS, ULTRALOW-TEMPERATURE RESISTANT ASA RESIN COMPOSITION AND PREPARATION METHOD THEREOF

CROSS-REFERENCE TO RELATED APPLICATIONS

This application is a national stage application of PCT Application No. PCT/CN2016/113471. This Application claims priority from PCT Application No. PCT/CN2016/113471, filed Dec. 30, 2016, and CN Application No. 201611219042.X, filed Dec. 26, 2016, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

TECHNICAL FIELD

The present disclosure relates to the field of polymer materials, more particularly to an ultralow-glossiness, ultralow-temperature resistant ASA resin composition and preparation method thereof.

BACKGROUND

Acrylonitrile-styrene-acrylate graft copolymer (ASA) is a weather resistant engineering plastic similar in structure to acrylonitrile-butadiene-styrene graft copolymer (ABS), and retains excellent mechanical and physical properties of ABS as engineering plastics. A commonly used ASA resin replaces butadiene rubber by introducing a butyl acrylate rubber containing a double bond, so that only light having a wavelength of less than 300 nm is affected by aging, and thus the weather resistance thereof is substantially improved, about 10 times higher than ABS, and is widely used in the fields of building materials, automobile exterior parts, electrical and electronic engineering exterior parts, outdoor products, sports equipment, and the like.

However, the butyl acrylate rubber used in ASA resin has a glass transition temperature of only about −40° C., which determines that it is difficult to have good impact toughness at low temperatures, and this defect greatly limits the application of ASA resin in a low temperature environment.

The patent CN 102161808 B discloses an ASA resin having excellent appearance performance and preparation method thereof, the resin includes the following components in parts by weight: 10~50 parts of SAN, 50~90 parts of an acrylonitrile-acrylate-styrene cross-linked modified graft copolymer, 0.2~0.6 parts of a light stabilizer, 0.2~1 parts of an antioxidant, and 0.2~2 parts of a lubricant; feeding the above raw materials into a twin-screw extruder after stirring and mixing, under the conveying, shearing and kneading of a screw, the materials are melted and compounded, and then extrusion, drawing, cooling and granulating to obtain an acrylonitrile-styrene-acrylate resin having excellent appearance performance. Although the ASA resin prepared has excellent mechanical property and apparent property, its toughness in low temperature conditions below −30° C. is poor due to a high glass transition temperature.

The patent CN 102030958 B discloses an ASA resin composition having high heat resistance, high weather resistance, good comprehensive mechanical properties and processability, but there still has problem of poor low temperature toughness described above.

In addition, products prepared by the acrylonitrile-styrene-acrylate graft copolymer (ASA) typically have a certain surface glossiness, however this is not a desirable property for some applications, particularly in applications such as computer housings, keyboards, appliances, and automobile parts and so on, and thus there is a large demand for a low glossiness composition.

WO 2006/127223 discloses an impact-modified ASA resin composition and preparation method thereof, although the impact resistance can be improved by compounding several modified copolymers of AMSAN, MMASAN and MMA-ASA, the resin composition prepared is generally high in gloss, and is not suitable for parts having low gloss requirements.

Generally speaking, there are typically several technical means for reducing article glossiness:

1) Good effects can be achieved by surface embossing, that is, by a leather texturing treatment. However, the method for reducing gloss only by changing a texture structure of the article surface, which still is not well satisfied the requirement of glossiness in some cases; in addition, once the surface texture structure of the article is lost due to the scratch-resistant problem of the resin, a significant difference of glossiness is immediately occurs, causing visual color difference that result in failure.

2) Add incompatible materials such as incompatible resins and mineral fillers. For example, other similar inert materials such as silica, silicate or aluminate can reduce the glossiness of a thermoplastic molding composition, however, which is usually accompanied by a decrease in certain physical properties, particularly the impact strength, correspondingly, a heat distortion temperature is reduced accordingly, a welding strength is reduced, the weather resistance and light stablility are insufficient, and other important properties are reduced. For example, WO 2010/049320 proposes to use a melamine-added derivative to reduce glossiness of resin, while CN 1128776A proposes to add nitrile rubber to PC/ABS alloy to reduce glossiness of the alloy. However, incompatible materials usually cause deterioration of mechanical properties of the resin itself.

3) Add reactive resins. For example reactive resins such as PS-g-GMA, SAN-g-GMA are added, when improving the glossiness of the article, it is required to be added in a high amount due to poor reaction activity, resulting in low efficiency and a certain influence on mechanical properties and the like. Adding a resin containing a glycidyl methacrylate (GMA) functional group to PC and alloy thereof can reduce glossiness as disclosed in U.S. Pat. Nos. 4,902,743, 4,742,104, CN 101851430, and CN 101787192.

4) Adding a cross-linking resin. WO 2003/027181 A2 discloses a preparation method of a low-gloss ASA resin, and the resin is prepared by adding a matting agent containing an epoxy functional and an amine functional group in a molecular chain in a formulation, the matting agent is added in an amount of 0.5-15%, preferably 3-12%, further preferably 5~10%, mainly through a cross-linked reaction of the epoxy functional group and the amine functional group to reduce the glossiness of the ASA resin. Although the glossiness of the resin prepared by the method is remarkably reduced, the mechanical properties such as impact strength, tensile strength, bending strength, and bending modulus are also reduced in some extent. CN 102617973 adopts the above method, the purpose of increasing the melt strength of the ABS resin is attained by achieving cross-linking; however, the reaction efficiency tends to be relatively low, and the cross-linking reaction tends to cause a significant melt swelling of the melt strip at the opening mold of the extruder, so that makes subsequent grain-sized dicing and dispersion in the resin much difficult.

However, the above method for reducing the surface glossiness of material tends to further reduce the normal temperature and low temperature impact performance of the ASA resin, resulting in a further decrease in the toughness of the material, which directly affects the normal use of the article.

SUMMARY

Against the deficiencies in the existing technologies, the present disclosure provides an ultralow-glossiness, ultralow-temperature resistant ASA resin composition and preparation method thereof. The low-temperature resistance impact of the ASA resin composition is significantly improved, and meanwhile the glossiness of material is also greatly reduced.

The object of the present disclosure is achieved by the following technical solutions.

The present disclosure provides an ultralow-glossiness, ultralow-temperature resistant ASA resin composition, including the following components in parts by weight:

20~60 parts of an acrylonitrile-styrene-acrylate graft copolymer,

40~80 parts of an acrylonitrile-styrene copolymer,

1~20 parts of an ultralow-glossiness, low temperature resistant modifier, and 0.1~5 parts of a processing aid.

Preferably, the acrylonitrile-styrene-acrylate graft copolymer has a core-shell structure formed by taking acrylate as a soft core, grafted acrylonitrile and styrene; where in the acrylonitrile-styrene-acrylate graft copolymer, acrylate has a weight percentage of 30~80 wt %, and a number average particle size of 0.1~4.0 μm; the acrylonitrile-styrene-acrylate graft copolymer has a weight-average molecular weight of 100,000~300,000.

More preferably, in the acrylonitrile-styrene-acrylate graft copolymer, acrylate has a weight percentage of 45~60 wt %, and a number average particle size of 0.5~2.0 μm.

When a particle size of rubber is less than 0.5 μm, the glossiness is significantly improved; and when the particle size of rubber is larger than 2.0 μm, a rigidity of ASA resin will be greatly reduced.

More preferably, the acrylonitrile-styrene-acrylate graft copolymer has a weight-average molecular weight of 200,000~400,000, acrylonitrile has a weight percentage of 25~35 wt %.

Preferably, the ultralow-glossiness, low temperature resistant modifier includes components in a weight percentage as follows:

10~70 wt % of a carrier copolymer,
10~70 wt % of a fluorinated copolymer,
5~50 wt % of a low temperature flexibilizer,
5~25 wt % of a coupling agent,
1~5 wt % of fumed silica, and
0.1~5 wt % of an assistant.

Preferably, the carrier copolymer is at least one of selected from the groups of poly(methyl methacrylate), polystyrene, poly(α-alkyl)styrene, maleic anhydride modified styrene polymer, styrene/maleic anhydride copolymer, maleimide modified styrene polymer, styrene-N arylmaleimide copolymer, styrene/acrylonitrile compolyer, (α-alkyl)styrene/acrylonitrile copolymer, styrene/(α-alkyl)styrene/acrylonitrile copolymer, styrene/acrylonitrile/methyl methacrylate copolymer, styrene/(α-alkyl)styrene/acrylonitrile/methyl methacrylate copolymer, and (α-alkyl)styrene/acrylonitrile/methyl methacrylate copolymer.

Preferably, the fluorinated copolymer is poly(fluorinated alkene), selected from at least one of the groups consisting of polytetrafluoroethylene, polyvinylidene fluoride, tetrafluoroethylene/hexafluoropropylene copolymer, tetrafluoroethylene/ethylene copolymer, tetrafluoroethylene/perfluoroalkyl ether copolymer, polyvinyl fluoride, chlorotrifluoroethylene/ethylene copolymer, and poly(chlorotrifluoroethylene).

Preferably, the low temperature flexibilizer is a core-shell structure copolymer formed by taking silicone rubber, acrylic rubber, and silicon/acrylate composite rubber as a core, and taking acrylonitrile-styrene graft copolymer, alkyl acrylate copolymer, epoxy modified alkyl acrylate copolymer as a shell layer.

Preferably, the coupling agent is a silane coupling agent, includes one or more of an amino functional silane coupling agent, a vinyl functional silane coupling agent, an epoxy functional silane coupling agent, and a methacryloyl functional silane coupling agent.

More preferably, the coupling agent is a vinyl functional silane coupling agent, an epoxy functional silane coupling agent; and most preferred is diethylenetriamine propyltrimethoxy siloxane, and dimethylethoxy silane.

Preferably, a preparation method of the ultralow-glossiness, low temperature resistant modifier includes steps of:

weighing components in parts by weight, after a thorough and uniformly mixing, extruding and granulating by a twin-screw extruder to obtain the ultralow-glossiness, low temperature resistant modifier.

Preferably, the processing aid and the assistant include one or a mixture of an antioxidant, a lubricant and a light stabilizer.

Preferably, the antioxidant is one or a mixture of a hindered phenol or a phosphate ester antioxidant.

Preferably, the lubricant is one or a mixture of an alkyl silicone oil, a polyolefin wax, an oxidized polyolefin wax, a pentaerythritol ester, a fatty acid ester, or an amide wax lubricant, and so on.

Preferably, the light stabilizer is one or a mixture of salicylates, benzophenones, benzotriazoles, or a substituted triazine ultraviolet absorber, and a hindered amine free radical scavenger.

The present disclosure further provides a method for preparing the ultralow-glossiness, ultralow-temperature resistant ASA resin composition described above, the method includes steps of:

step 1: preparing raw materials based on the following components in parts by weight: 20~60 parts of an acrylonitrile-styrene-acrylate graft copolymer, 40~80 parts of an acrylonitrile-acrylate copolymer, 1~20 parts of an ultralow-glossiness, low temperature resistant modifier, and 0.1~5 parts of a processing aid;

step 2: stirring and mixing the raw material prepared in step 1 in a high-speed mixer, extruding and granulating by a twin-screw extruder to obtain the ultralow-glossiness, ultralow-temperature resistant ASA resin composition.

Preferably, in step 2, the twin-screw extruder has a length-diameter ratio of 36 to 44, and the twin-screw extruder is provided with a temperature control device and a vacuuming device.

Preferably, in step 2, the twin-screw extruder has an extrusion temperature of 200~300° C., and a screw speed of 200~500 r/min.

Compared with the existing technologies, the present disclosure has the following beneficial effects:

1. The composition of the present disclosure adopts a core-shell structure copolymer for low temperature toughening, innovatively uses a fluoropolymer to reduce the surface glossiness of material, and improves the compatibility with matrix by a silane coupling agent, using a small amount of $SiO_2$, further promotes the reduction of glossiness while relieving the extrusion of the resin melt, and the resulting composition has little effect on other physical properties except for excellent low temperature toughness and very low surface glossiness.

2. The composition of the present disclosure is compounded with three components of a core-shell structure copolymer, a fluoropolymer and a silane coupling agent to reduce the surface glossiness of material and improve the low temperature toughness; surprisingly, the compounded of the three components has a synergistic effect on the improvement of the above two properties, and three components are compounded to form a system, the surface glossiness of the material is greatly reduced, meanwhile, the low temperature toughness of the material is also greatly improved.

3. The ASA resin composition prepared by the present disclosure has an ultralow-glossiness, can be used to replace mold processing technology such leather marking, texturing, which greatly saves mold cost and processing production cost; and meanwhile it also has excellent low temperature resistance and can be applied in some cases having requirements on low temperature resistance, low glossiness such as automobile parts, outdoor profiles, building materials and electrical appliances, and so on.

DETAILED DESCRIPTION

The present disclosure will be described in detail with reference to specific examples. The following examples are intended to further understand the present disclosure, but are not intended to limit the present disclosure in any way. It should be noted that a number of variations and modifications may be made by those skilled in the art without departing from the present disclosure. These are all within the protect scope of the present disclosure.

Example 1 Preparation of the Ultralow-Glossiness, Low Temperature Resistant Modifier The components and weight percentage contents of the ultralow-glossiness, low temperature resistant modifier (E) are shown in Table 1. A carrier copolymer (A), a fluorinated copolymer (B), a low temperature toughening agent (C), a coupling agent (D), fumed silica, 0.7 phr of a lubricant EBS and 0.3 phr of an antioxidant IG-1076 are stirred and mixed in a high-speed mixer, and fed into a twin-screw extruder through a metering device, under a conveying, shearing and mixing of the screws, the above materials are melted and compounded, and then extruded, drawn, cooled and granulated, to obtain an ultra-low glossiness, low temperature resistance modifier E1~E8 with uniform particle size.

Where, the twin-screw extruder has a screw length-diameter ratio of 40, the twin-screw extruder has an extrusion temperature of 200~300° C., and a screw rotation speed is 200~500 r/min.

TABLE 1

Preparation of the ultralow-glossiness, low temperature resistant modifier (E)

| Formulation component | E1 | E2 | E3 | E4 | E5 | E6 | E7 | E8 |
|---|---|---|---|---|---|---|---|---|
| Component A-1 | 28 | / | 28 | 28 | 70 | 31 | 57 | 57 |
| Component A-2 | / | 28 | / | / | / | / | / | / |
| Component B-1 | 29 | 29 | / | 29 | 29 | 29 | 29 | / |
| Component B-2 | / | / | 29 | / | / | / | / | / |
| Component C-1 | 29 | 29 | 29 | / | / | 29 | / | 29 |
| Component C-2 | / | / | / | 29 | / | / | / | / |
| Component D-1 | 10 | 10 | 10 | 10 | / | 10 | 10 | 10 |
| Fumed silica | 3 | 3 | 3 | 3 | / | / | 3 | 3 |
| lubricant | 0.7 | 0.7 | 0.7 | 0.7 | 0.7 | 0.7 | 0.7 | 0.7 |
| antioxidant | 0.3 | 0.3 | 0.3 | 0.3 | 0.3 | 0.3 | 0.3 | 0.3 |
| Appearance of the modifier | Even and matte | Even and matte | Even and matte | Even and matte | uneven and matte | uneven and matte | Even and matte | uneven and specular |

In table 1:
Component A-1: styrene/acrylonitrile copolymer, has a weight-average molecular weight of 250,000
Component A-2: poly(methyl methacrylate), has a weight-average molecular weight of 250,000.
Component B-1: polytetrafluoroethylene, has a weight-average molecular weight of 200,000.
Component B-2: polyvinylidene fluoride, has a weight-average molecular weight of 200,000.
Component C-1: a core-shell structure copolymer having an acrylate rubber as a core and an acrylonitrile-styrene craft copolymer as a shell layer.
Component C-2: a core-shell structure copolymer of silicon/acrylate composite rubber as a core, and epoxy modified methyl methacrylate as a shell.
Component D-1: silane coupling agent, KH-550.

From the appearance results of the modifier of table 1, it can be seen that by using a cross-linking reaction of three components compounded of the core-shell structure copolymer, the fluoropolymer and the silane coupling agent, an ultra-low glossiness, low temperature resistant modifier (E) having a uniform appearance can be prepared, and the matt effect is evenly distributed. It can be seen from E5, E6 and E7 that the addition of the coupling agent and fumed silica has a great influence on the uniformity of the matte effect, and only in the case where both two components are present at the same time, the cross-linking reaction of the coupling agent and promotion of dispersion of fumed silica can achieve a soft and uniform matte effect on the surface. It is known from E1, E3 and E8 that the fluoropolymer can significantly reduce the glossiness of the ASA resin.

Examples 2~9 Preparation of the Ultralow-Glossiness, Ultralow-Temperature Resistant ASA Resin Composition Examples 2 to 9 provide an ultralow-glossiness, ultralow-temperature resistant ASA resin composition and a preparation method thereof, the components and the weight percentages of the ultralow-glossiness, ultralow-temperature resistant ASA resin composition as shown in table 2. The method include the steps of: An acrylonitrile-styrene-acrylate graft copolymer, an acrylonitrile-styrene copolymer, an ultralow-glossiness, low temperature resistant modifier (E), 0.6 phr of a lubricant EBS and 0.3 phr of an antioxidant IG-1076 are stirred and mixed in a high-speed mixer, and fed into a twin-screw extruder through a metering device, under a conveying, shearing and mixing of the screws, the above components are melted and compounded, and then extruded, drawn, cooled and granulated, to obtain the ultralow-glossiness, ultralow-temperature resistance ASA resin composition.

Where, the twin-screw extruder has a screw length-diameter ratio of 40, the twin-screw extruder has an extrusion temperature of 200~300° C., and a screw rotation speed is 200~500 r/min.

Comparative Examples 1~6

Comparative examples 1~6 provide an ultralow-glossiness, ultralow-temperature resistant ASA resin composition and a preparation method thereof, the components and the weight percentages of the ultralow-glossiness, ultralow-temperature resistant ASA resin composition as shown in table 2. The method include the steps of: An acrylonitrile-styrene-acrylate graft copolymer, an acrylonitrile-styrene copolymer, an ultralow-glossiness, low temperature resistant modifier (E), 0.6 phr of a lubricant EBS and 0.3 phr of an antioxidant IG-1076 are stirred and mixed in a high-speed mixer, and fed into a twin-screw extruder through a metering device, under a conveying, shearing and mixing of the screws, the above components are melted and compounded, and then extruded, drawn, cooled and granulated, to obtain the ultralow-glossiness and ultralow-temperature resistance ASA resin composition.

Where, the twin-screw extruder has a screw length-diameter ratio of 40, the twin-screw extruder has an extrusion temperature of 200~300° C., and a screw rotation speed is 200~500 r/min.

TABLE 2 material formulation of the examples and the comparative examples

| Formulation component | Example 2 | Example 3 | Example 4 | Example 5 | Example 6 | Example 7 | Example 8 | Example 9 |
|---|---|---|---|---|---|---|---|---|
| acrylonitrile-styrene-acrylate graft copolymer | 40 | 40 | 40 | 40 | 40 | 40 | 60 | 20 |
| acrylonitrile-styrene copolymer | 60 | 60 | 60 | 60 | 60 | 60 | 40 | 80 |
| E1 | 10 | / | / | / | / | / | / | / |
| E2 | / | 10 | / | / | / | / | / | / |
| E3 | / | / | 10 | / | / | / | / | / |
| E4 | / | / | / | 10 | 1 | 20 | 10 | 10 |
| E5 | / | / | / | / | / | / | / | / |
| E6 | / | / | / | / | / | / | / | / |
| E7 | / | / | / | / | / | / | / | / |
| E8 | / | / | / | / | / | / | / | / |
| Processing aid | 0.9 | 0.9 | 0.9 | 0.9 | 0.9 | 0.9 | 0.9 | 0.9 |

| Formulation component | Comparative example 1 | Comparative example 2 | Comparative example 3 | Comparative example 4 | Comparative example 5 | Comparative example 6 |
|---|---|---|---|---|---|---|
| acrylonitrile-styrene-acrylate graft copolymer | 40 | 40 | 40 | 40 | 40 | 40 |
| acrylonitrile-styrene copolymer | 60 | 60 | 60 | 60 | 60 | 60 |
| E1 | / | / | / | / | / | / |
| E2 | / | / | / | / | / | / |
| E3 | / | / | / | / | / | / |
| E4 | / | 30 | / | / | / | / |
| E5 | / | / | 1.0 | / | / | / |
| E6 | / | / | / | 10 | / | / |
| E7 | / | / | / | / | 10 | / |
| E8 | / | / | / | / | / | 10 |
| Processing aid | 0.9 | 0.9 | 0.9 | 0.9 | 0.9 | 0.9 |

The above examples and the comparative examples relate to the components and features are as follows:

The acrylonitrile-styrene-acrylate graft copolymer is prepared by taking acrylate as a soft core, grafted acrylonitrile and styrene to form a core-shell structure, where the acrylate has a weight percentage of 45~60 wt %, acrylate has a number average particle size of 0.5~2.0 um, and the acrylonitrile-styrene-acrylate graft copolymer has a weight-average molecular weight of 100,000~300,000.

The acrylonitrile-styrene copolymer has a weight-average molecular weight of 200,000~400,000, acrylonitrile has a weight percentage of 25~35 wt %.

The processing aid is 0.6 phr of a lubricant EBS and 0.3 phr of an antioxidant IG-1076.

The ASA resin composition prepared according to the examples 2~9 and the comparative example 1~5, a test sample strip is prepared by the same injection molding conditions, the specific mechanical property and the glossiness evaluation tests are as follows:

Tensile strength: tested according to the ISO 527 standard, a testing speed is 50 mm/min;

Bending strength: tested according to the ISO 178 standard, a testing speed is 2 mm/min;

Bending modulus: tested according to the ISO 178 standard, a testing speed is 1 mm/min;

Notched izod impact strength at 23° C.: tested according to the ISO 180 standard, a thickness of the sample strip is 4 mm;

Notched izod impact strength at −40° C.: tested according to the ISO 180 standard, a thickness of the sample strip is 4 mm, and a test condition is −40° C./4 h;

Heat distortion temperature: tested according to the ISO 75 standard, a test condition is 0.45 MPa;

Melt flow rate: tested according to the ISO 1183 standard, a test condition is 220° C./10 kg;

Glossiness: the surface glossiness of a common color plate with a thickness of 3 mm and K31 matte leather color plate is tested according to ASTM D523 at 60° C. by using Garden Gloss Meter, and recorded in units of gloss units (GU), where the glossiness of a standard black glass sheet is 100 GU.

The test results are shown in table 3.

TABLE 3

Performance comparison between the examples and the comparative examples

| Material performance | example 2 | example 3 | example 4 | example 5 | example 6 | example 7 | example 8 | example 9 |
|---|---|---|---|---|---|---|---|---|
| Tensile strength | 44 | 47 | 45 | 47 | 49 | 46 | 37 | 57 |
| Bending modulus (MPa) | 2205 | 2350 | 2223 | 2320 | 2368 | 2270 | 1890 | 2610 |
| Notched izod impact strength at 23° C. (KJ/m$^2$) | 12.6 | 13.6 | 13.3 | 14.5 | 11.4 | 16.1 | 20.7 | 8.3 |
| Notched izod impact strength at −40° C. (KJ/m$^2$) | 40 | 5.2 | 4.7 | 5.5 | 2.2 | 7.6 | 6.5 | 3.0 |
| Heat distortion temperature (° C.) | 100.9 | 100.5 | 99.8 | 100.1 | 101.6 | 99.4 | 94.2 | 104.9 |
| Melt flow rate (g/10 min) | 5.4 | 4.2 | 4.6 | 5.0 | 5.2 | 35 | 2.8 | 9.3 |
| Glossiness of common color plate | 30 | 28 | 34 | 31 | 82 | 22 | 27 | 41 |
| Glossiness of K31 leather color plate | 2.2 | 1.7 | 2.4 | 2.2 | 73 | 1.1 | 2.0 | 3.3 |

| Material performance | Comparative example 1 | Comparative example 2 | Comparative example 3 | Comparative example 4 | Comparative example 5 | Comparative example 6 |
|---|---|---|---|---|---|---|
| Tensile strength | 51 | 45 | 50 | 49 | 49 | 48 |
| Bending modulus (MPa) | 2190 | 2202 | 2150 | 2120 | 2130 | 2182 |
| Notched izod impact strength at 23° C. (KJ/m$^2$) | 10.9 | 25.5 | 9.8 | 12.9 | 10.8 | 12.0 |
| Notched izod impact strength at −40° C. (KJ/m$^2$) | 1.8 | 8.5 | 1.4 | 4.2 | 1.7 | 3.8 |
| Heat distortion temperature (° C.) | 101.5 | 98.0 | 100.8 | 100.6 | 100.7 | 100.3 |
| Melt flow rate (g/10 min) | 6.2 | 1.7 | 5.5 | 5.0 | 4.9 | 5.5 |
| Glossiness of common color plate | 98 | 18 | 54 | 46 | 45 | 92 |
| Glossiness of K31 leather color plate | 8.9 | 0.8 | 4.3 | 4.0 | 3.9 | 8.1 |

From the test results of the examples and the comparative examples in table 3, it can be seen that from the examples 2~7, the glossiness of the ASA resin of the present disclosure is greatly reduced, and a low temperature toughness of the material is greatly improved, while the influence on other mechanical properties is not obvious. From example 1, examples 5~9 and the comparative example 1, it is known that an increase in the rubber content can increase a normal temperature impact toughness of the material, and contribute little to a low temperature toughness; in addition, it also has a great influence on the strength and heat resistance of the material; while an increase of the content of the ultralow-glossiness, low temperature modifier (E) can effectively improve the low temperature impact toughness of the material and effectively reduce the glossiness of the material. In contrast, the influence on other mechanical properties is very small. It can be seen from the comparative example 2 that the content of the ultralow-glossiness, low temperature modifier (E) is not as good as possible. When the mass fraction is 30 parts, its influence on heat resistance and fluidity is large, and the melt flow rate is greatly reduced, which directly affects the processability of the ASA resin. Therefore, it is not too high to control the proper addition amount. From the comparative examples 5 to 6, it is known that the fluorinated copolymer has a great effect on lowering the glossiness, and the core-shell structure copolymer a remarkable effect on improving the low temperature toughness, and further comparison of the examples 2 to 9 and the comparative examples 5 to 6, it is known that the fluorinated copolymer and the core-shell structure copolymer have synergistic effects on reducing the glossiness of the material and improving the low temperature toughness, and finally prepared the ASA resin composition has excellent ultralow-glossiness and excellent low temperature resistance, and can be applied to outdoor products such as building materials, sports equipment, communication equipment casings and automobile parts and soon on.

In conclusion, the present disclosure adopts a cross-linking reaction of a core-shell structure copolymer, a fluoropolymer and a silane coupling agent to prepare an ultralow-glossiness, low temperature resistance modifier (E) with uniform appearance, and further prepare an ultralow-glossiness, ultralow-temperature resistant ASA resin composition, the obtained ASA resin composition has ultralow surface glossiness and excellent low temperature resistance toughness. The present disclosure solves the problem that low glossiness and low temperature toughness of the ASA resin in the existing technologies are difficult to balance. The ASA resin composition prepared by the present disclosure has high low temperature toughness, and the Notched izod impact strength at −40° C. can reach 7 KJ/m$^2$ or more, which is equivalent to the low temperature toughness of the ABS resin, and can meet the low temperature storage requirement of the automobile parts article, and the heat resistance of the ASA resin composition is high, which also can meet the high temperature storage requirements of the article. In addition, the ASA resin prepared by the present disclosure has a soft and uniform matte effects, and also has a ultralow surface glossiness, can be well applied to some occasions with low gloss requirements, and can even try to replace the mold processing techniques such as leather marking and texturing, which greatly saves mold cost and processing production cost.

There are many specific application paths of the present disclosure, and the above description is only preferred examples of the present disclosure. It should be noted that the above examples are merely illustrative of the present disclosure but not intended to limit the protect scope of the present disclosure. A number of modifications may be made by those skilled in the art without departing from the principles of the present disclosure, and such modifications are also should be considered to be within the protection scope of the present disclosure.

What is claimed is:

1. An ultralow-glossiness, ultralow-temperature resistant ASA resin composition, wherein the composition comprises the following components in parts by weight:
    20~60 parts of an acrylonitrile-styrene-acrylate graft copolymer,
    40~80 parts of an acrylonitrile-styrene copolymer,
    1~20 parts of an ultralow-glossiness, low temperature resistant modifier, and
    0.1~5 parts of a processing aid, wherein the ultralow-glossiness, low temperature resistant modifier comprises the following components in a weight percentage:
    10~70 wt % of a carrier copolymer,
    10~70 wt % of a fluorinated copolymer,
    5~50 wt % of a flexibilizer,
    5~25 wt % of a coupling agent,
    1~5 wt % of fumed silica, and
    0.1~5 wt % of an assistant.

2. The ultralow-glossiness, ultralow-temperature resistant ASA resin composition according to claim 1, wherein in the acrylonitrile-styrene-acrylate graft copolymer, acrylate has a weight percentage of 30~80 wt %, acrylate has a number average particle size of 0.1~4.0 μm; and the acrylonitrile-styrene-acrylate graft copolymer has a weight-average molecular weight of 100,000~300,000.

3. The ultralow-glossiness, ultralow-temperature resistant ASA resin composition according to claim 1, wherein the acrylonitrile-styrene copolymer has a weight-average molecular weight of 100,000~500,000, wherein acrylonitrile has a weight percentage of 15~40 wt %.

4. The ultralow-glossiness, ultralow-temperature resistant ASA resin composition according to claim 1, wherein the carrier copolymer is selected from at least one of the groups consisting of poly(methyl methacrylate), polystyrene, poly (α-alkyl)styrene, maleic anhydride modified styrene polymer, styrene/maleic anhydride copolymer, maleimide modified styrene polymer, styrene-N arylmaleimide copolymer, styrene/acrylonitrile compolyer, (α-alkyl)styrene/acrylonitrile copolymer, styrene/(α-alkyl)styrene/acrylonitrile copolymer, styrene/acrylonitrile/methyl methacrylate copolymer, styrene/(α-alkyl)styrene/acrylonitrile/methyl methacrylate copolymer, and (α-alkyl)styrene/acrylonitrile/methyl methacrylate copolymer.

5. The ultralow-glossiness, ultralow-temperature resistant ASA resin composition according to claim 1, wherein the fluorinated copolymer is poly(fluorinated alkene), selected from at least one of the groups consisting of polytetrafluoroethylene, polyvinylidene fluoride, tetrafluoroethylene/hexafluoropropylene copolymer, tetrafluoroethylene/ethylene copolymer, tetrafluoroethylene/perfluoroalkyl ether copolymer, polyvinyl fluoride, chlorotrifluoroethylene/ethylene copolymer, and poly(chlorotrifluoroethylene).

6. The ultralow-glossiness, ultralow-temperature resistant ASA resin composition according to claim 1, wherein the flexibilizer is a core-shell structure copolymer formed by taking any one of silicone rubber, acrylic rubber, and silicon/acrylate composite rubber as a core, and taking any one of acrylonitrile-styrene graft copolymer, alkyl acrylate copolymer, epoxy modified alkyl acrylate copolymer as a shell.

7. The ultralow-glossiness, ultralow-temperature resistant ASA resin composition according to claim 1, wherein the coupling agent is a silane coupling agent, comprises one or more of an amino functional silane coupling agent, a vinyl functional silane coupling agent, an epoxy functional silane coupling agent, and a methacryloyl functional silane coupling agent.

8. The ultralow-glossiness, ultralow-temperature resistant ASA resin composition according to claim 1, wherein a preparation method of the ultralow-glossiness, low temperature resistant modifier comprises steps of:

weighing components in parts by weight, after a thorough and uniformly mixing, extruding and granulating by a twin-screw extruder to obtain the ultralow-glossiness, low temperature resistant modifier.

9. A method for preparing the ultralow-glossiness, ultralow-temperature resistant ASA resin composition according to claim 1, wherein the method comprises steps of:

step 1: preparing raw materials based on the following components in parts by weight: 20~60 parts of an acrylonitrile-styrene-acrylate graft copolymer, 40~80 parts of an acrylonitrile-styrene copolymer, 1~20 parts of an ultralow-glossiness, low temperature resistant modifier, and 0.1~5 parts of a processing aid;

step 2: stirring and mixing the raw material prepared in step 1 in a high speed mixer, extruding and granulating by the twin-screw extruder to obtain the ultralow-glossiness, ultralow-temperature resistant ASA resin composition.

* * * * *